United States Patent
Sampathkumar et al.

(10) Patent No.: US 9,378,152 B2
(45) Date of Patent: Jun. 28, 2016

(54) SYSTEMS AND METHODS FOR I/O PROCESSING USING OUT-OF-BAND HINTING TO BLOCK DRIVER OR STORAGE CONTROLLER

(71) Applicant: LSI Corporation, San Jose, CA (US)

(72) Inventors: Kishore Kaniyar Sampathkumar, Bangalore (IN); Parag Maharana, Fremont, CA (US); Sumanesh Samanta, Bangalore (IN); Saugata Das Purkayastha, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 208 days.

(21) Appl. No.: 14/274,153

(22) Filed: May 9, 2014

(65) Prior Publication Data

US 2015/0324300 A1 Nov. 12, 2015

(51) Int. Cl.
*G06F 12/00* (2006.01)
*G06F 12/12* (2016.01)
*G06F 12/08* (2016.01)

(52) U.S. Cl.
CPC .......... *G06F 12/122* (2013.01); *G06F 12/0871* (2013.01); *G06F 12/0888* (2013.01); *G06F 2212/604* (2013.01); *G06F 2212/6046* (2013.01); *G06F 2212/69* (2013.01)

(58) Field of Classification Search
CPC .............. G06F 12/122; G06F 12/0888; G06F 12/0871; G06F 2212/6046; G06F 2212/604; G06F 2212/69; G06F 12/0893

USPC .......................... 711/137, 138, 139; 707/822
See application file for complete search history.

(56) References Cited

U.S. PATENT DOCUMENTS

| | | | |
|---|---|---|---|
| 6,219,693 B1 * | 4/2001 | Napolitano | G06F 3/0611 707/E17.01 |
| 7,571,318 B2 * | 8/2009 | Strongin | G06F 12/145 712/228 |
| 2008/0320235 A1 | 12/2008 | Beckmann et al. | |
| 2011/0119228 A1 | 5/2011 | Menze et al. | |
| 2013/0262533 A1 * | 10/2013 | Mitra | G06F 17/30132 707/822 |
| 2014/0052927 A1 * | 2/2014 | McCauley | G06F 12/0862 711/137 |
| 2014/0075125 A1 | 3/2014 | Biswas et al. | |
| 2014/0372699 A1 * | 12/2014 | Desai | G06F 12/0893 711/118 |
| 2015/0058571 A1 * | 2/2015 | Potter | G06F 9/30043 711/125 |
| 2015/0178201 A1 * | 6/2015 | Sampathkumar | G06F 3/06 711/135 |
| 2015/0261681 A1 * | 9/2015 | Craddock | G06F 13/16 711/122 |

* cited by examiner

*Primary Examiner* — Hong Kim

(57) ABSTRACT

A storage subsystem can achieve more efficient I/O processing by enabling users to specify and pass out of band I/O hints comprising an object to be hinted, a hint type, and caching strategies associated with a hint type. A hinted object may be either a virtual device or a file. In addition to priority cache, hint types may include never-cache, sticky-cache, and volatile-cache. Hints may be passed via command-line or graphical-user interfaces.

20 Claims, 4 Drawing Sheets

SYSTEMS AND METHODS FOR I/O PROCESSING USING OUT-OF-BAND HINTING TO BLOCK DRIVER OR STORAGE CONTROLLER

TECHNICAL FIELD

This disclosure relates generally to data storage systems and particularly to I/O processing in data storage systems.

BACKGROUND

Flash-based caching implementations can handle all cached information in a uniform fashion. For example, frequently accessed or "hot" data can be cached to flash-based solid state drives (SSDs) or other similar devices, henceforth collectively referred to as cache devices. The corresponding cache is first made valid by reading the data blocks on the back-end disk (henceforth also referred to as virtual device or VD) and writing the target data to the cache device. Once the cache is valid, subsequent corresponding I/O reads are fetched from the cache device. In write-back (WB) mode, I/O writes are written only to the cache device and not to the VD. In write-through (WT) mode, I/O writes are written both to the cache device as well as the VD. In WB mode, whenever a cache window must be flushed (e.g., either during system recovery following a reboot, to free up active cache windows as part of least-recently-used (LRU) replacement, or to maintain a minimum number of free cache windows), the determination of which cache lines to flush is based on picking valid cache lines marked dirty. Usually, the flush can be done via background task. Once the flush is done successfully, the dirty bit for the corresponding cache lines is cleared (i.e., again becomes clean).

A standard caching approach can be generally characterized by a set of priority queues, a primarily LRU-based cache window promotion/demotion/replacement scheme, and data corresponding to the cache windows that are both read- and write-intensive. For example, priority queues from 1 to 16 (where 1 is the lowest priority and 16 the highest) can indicate less or more frequently accessed data. Generally, a caching algorithm can track hot data via a "heat" index: when a cached first block of hot data is no longer accessed as frequently compared to a second block of data (that may itself have become "hotter"), the heat index of the first block is reduced. Once the first block is sufficiently "cold" and there is not enough room for other data having a higher heat index, the cached first block is then replaced with "hotter" data from the second block.

Special in-band hints for file system I/O (generally indicating data priority or "heat") can be supplied by interfacing with the file system layer and storing file system contextual information (generally consisting of file system metadata) as hints. When a file system I/O is received it is then checked for associated file system hints. Such "hinted" I/Os can be given higher or lower priority for I/O processing and therefore marked as "hot" data for caching (or as "cold" data not to be cached). It may be desirable to specify hints for I/O processing in an out of band fashion independently of the normal I/O stream.

SUMMARY

Embodiments of the invention concern a system and methods for specifying and implementing I/O classifications, or hints, associated with specified files and data blocks of virtual devices (VDs) in a multi-level, out-of-band fashion. Out-of-band hints refer to hints sent via IOCTL, independent of the I/O stream, as opposed to "in-band" hints sent via I/O packet. In embodiments, various I/O classification hints may trigger correspondingly different caching approaches and strategies, resulting in efficient processing of I/O requests to files and VD data blocks or windows. In embodiments, a configuration tool may enable a user to directly interface with a block driver or storage controller and specify an object to be hinted, a classification or hint type, and additional instructions associated with a particular hint type. In embodiments, hint types may include priority cache hints as well as never-cache, sticky-cache, and volatile-cache hint types and associated caching strategies. In embodiments, a user may additionally pass hints out of band via command-line or graphical-user interfaces.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The invention may be better understood by those skilled in the art by reference to the accompanying figures in which.

DETAILED DESCRIPTION

Figure 1:
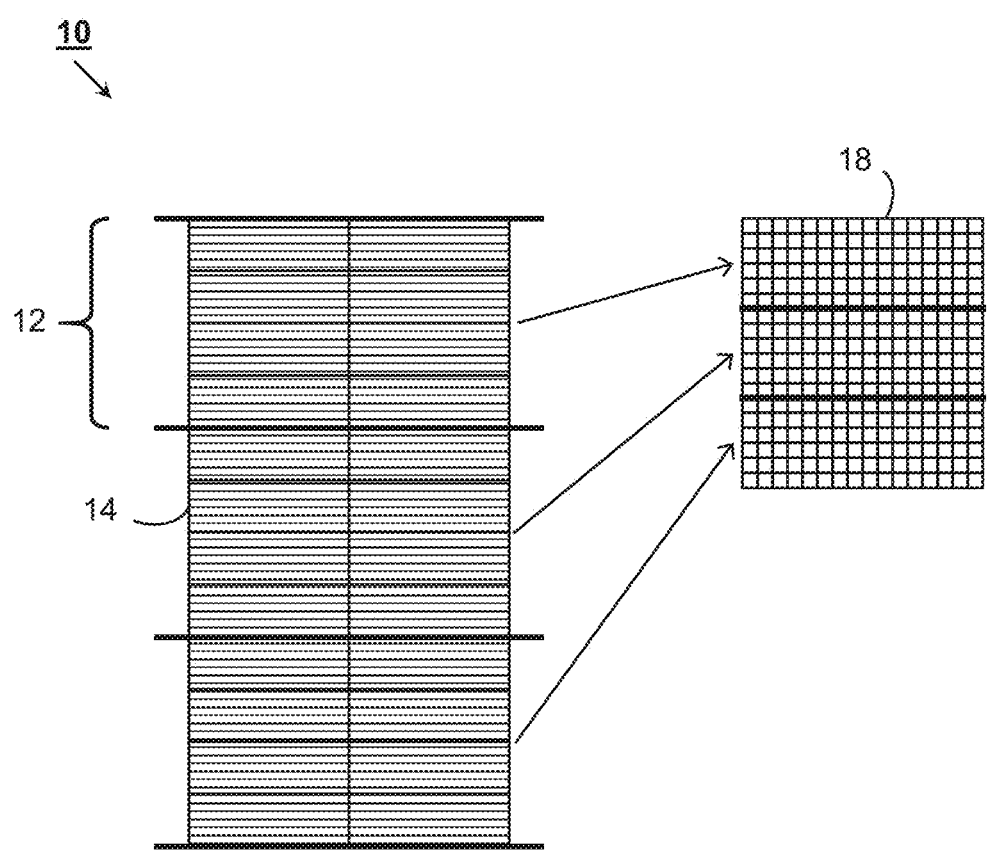
FIG. 1 is a block diagram of a prior art cache device.

FIG. 1 illustrates an embodiment of a standard cache device 10. The cache device 10 may generally be split into cache windows 12, which are in turn split into cache lines 14. Cached data can be read or written from the back-end disk or VD in units of cache-line size. Cache device 10 may further include cache data structures 18 (ex. —cache metadata) defined per cache window. Cache metadata 18 may keep track of whether a particular cache line 14 is resident in cache memory (ex.—valid/invalid state) in either write-through or write-back mode, and may additionally keep track of whether the cache line 14 has been modified and is therefore "dirty" (ex.—dirty/clean state) in write-back mode. In write-back mode, cache metadata 18 may be stored persistently on the cache device 10 and, if possible, also in RAM for faster access. Cache metadata updates may be persisted on the cache device 10. These updates may occur at the end of each host I/O modifying the cache metadata 18, and during shutdown.

Figure 2:
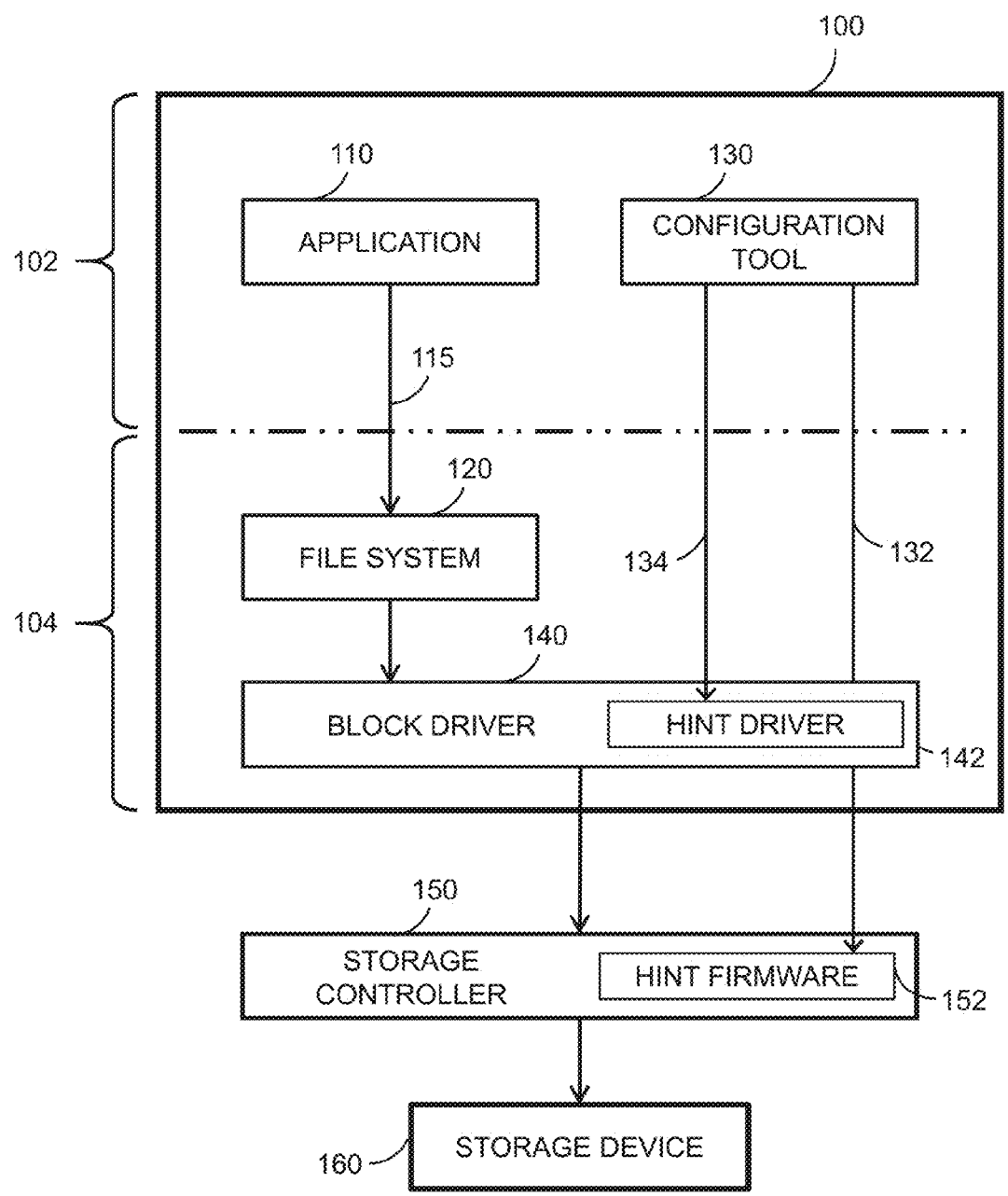
FIG. 2 is a block diagram of a data storage environment incorporating out of band hinting according to embodiments of the invention.

FIG. 2 illustrates a virtual device 100 (including user space 102 and kernel space 104), communicatively connected to a storage controller 150 and a storage device 160. In embodiments, a user may specify a hint out-of-band, or independent of the standard I/O packet path 115. In embodiments, an out-of-band hint may be passed via IOCTL. In embodiments, a hint may include the object to be hinted as well as a hint type. For example, a device hint 132 may be passed to the storage controller 150 and indicate a logical block address (LBA) range of the virtual device 100 while a file hint 134 may indicate a file name. In embodiments, a user may specify a priority-cache hint type, which directly specifies an explicit priority corresponding to an LRU priority queue. In embodiments, a user may specify additional hint types and associated caching strategies. For example, a never-cache hint may provide that the target object (ex.—device, file) never be cached, and may additionally force eviction of any existing cache. In embodiments, an I/O with a never-cache hint may bypass cache logic entirely, being sent directly to the VD without affecting the heat index of any window. In embodiments, a never-cache flag associated with a corresponding virtual window may indicate that the virtual window is never be promoted to a physical window.

In embodiments, a sticky-cache hint may provide that the target object always be kept in cache, that it never be evicted nor its defined priority altered. Embodiments of a storage subsystem according to the invention may additionally maintain a window with a sticky-cache hint in a separate queue, rather than in the LRU queue. The window may then be maintained in the separate cache until a subsequent hint from the host indicates that the window is no longer sticky, in which case the window may be removed to the standard LRU queue and recycled normally. In embodiments, by leaving this separate queue untouched any read/WT cache may be preserved from eviction by any other I/O. In embodiments, when an I/O with sticky-cache hint lands on a virtual window, the associated virtual window can be converted to a physical window immediately without regard to heat index or hit count. In embodiments, when placed in an AVL tree for flushing, a dirty window with sticky-cache hint may be treated like any other dirty window until its data are flushed, when the dirty window may then be placed in a special queue rather than the regular LRU queue.

In embodiments, a volatile-cache hint may indicate that the target object be kept in cache as long as possible, or at least until a system reboot. In embodiments, any corresponding "dirty" caches may additionally be considered "clean" over a reboot and thrown out, considerably improving the endurance of any Flash SSDs used for caching. In embodiments a write of volatile-cache hint type may be cached immediately, regardless of heat index. Additionally, if the virtual device configured to use this cache has a size not greater than the cache size, then the volatile-cache hint window may be kept in a separate queue rather than being placed in the AVL tree for flushing, whether or not the window is dirty. Consequently regular flush logic may never reach the volatile-cache window, which may not be otherwise flushed or recycled. In embodiments, a storage subsystem may maintain a volatile-cache window until a condition occurs to change the status of the window. For example, the cache may be discarded on first read (where the data is not needed after the first read) or in response to a firmware reboot, an upper layer command, or a subsequent hint including directions for discarding the volatile-cache window. In some embodiments, a single queue may be used for both sticky-cache and volatile-cache windows, with window flags serving to differentiate between the two types of windows.

In embodiments, a storage subsystem according to the invention may implement a hint engine to handle hint types. Embodiments of a hint engine may include hint firmware 152 for operating at the firmware level, which offers the advantage of portability across multiple operating system platforms, and hint drivers for handling hinting aspects at the operating system driver level. In embodiments, the hint engine (either the hint driver 142 in the block driver 140, or the hint firmware 152 in the storage controller 150) can interface with a user-space configuration tool 130 capable of loading, querying, modifying and removing hints. Embodiments of configuration tool 130 may include a command-line interface (CLI) or a graphical user interface (GUI). Embodiments of the hint engine can further accommodate passing out-of-band hints at the driver level as in-band hints to firmware. For example, a "priority value" field of at least 1 byte in size having more than 4 bits reserved for future use can use 2 bits to indicate four hint types: priority-cache (default value, defined as 0x00 for backward compatibility), sticky-cache, volatile-cache, and never-cache.

Figure 3A:
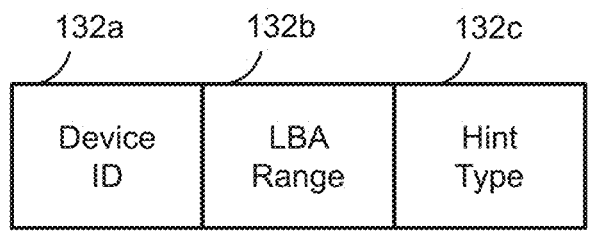
FIGS. 3A and 3B are block diagrams of hint structures according to embodiments of the invention.
Figure 3B:
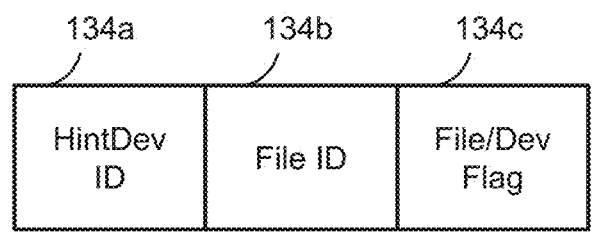
Figure 3C:
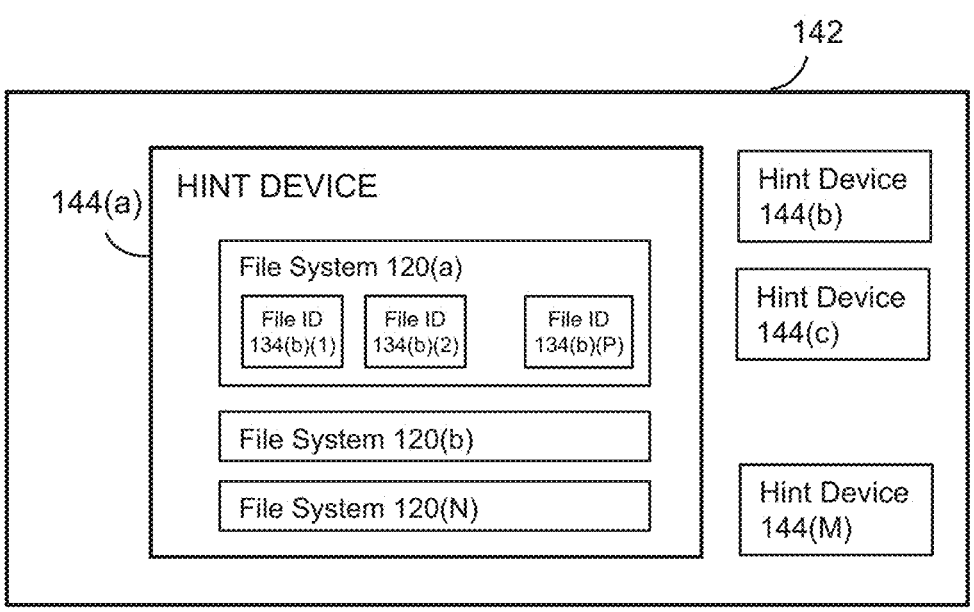
FIG. 3C is a block diagram of a hint table according to embodiments of the invention.

FIGS. 3A, 3B and 3C illustrate various embodiments of out-of-band hint frameworks according to the invention. Referring to FIG. 3A, in embodiments a user may pass an out-of-band device hint 132 by indicating the device 132a to be hinted (ex.—block device name/ID), the LBA range 132b corresponding to the device, and the hint type 132c. In embodiments, the user may pass out-of-band device hints via command-line interface (CLI) or via graphical user interface (GUI). For example, the user may first enable device hinting via CLI command, such as

MegaCli -hint -enbl -Lx a0 where -Lx corresponds to virtual device x and -a0 corresponds to storage controller/adapter 0. The user may then introduce new CLI command options for passing an out-of-band device hint 132, e.g.:

MegaCli -hint -range <LBA-range_1 . . . LBA_range_n> type <hint_type>-Lx a0

In embodiments, where disks are partitioned the firmware may only understand the concepts of logical device (LD) and LBA; therefore partition devices must be mapped:

[<LD_Number>, <Start_LBA_of_Partition>, <Num_LBAs_in_Partition>]

where <LD Number> corresponds to device ID 132a and the starting LBA of the LBA range 132b for the hint supplied may be calculated as <Start LBA>=<Start LBA of Partition>+<Start LBA Specified by Hint>.

In embodiments, both of these mappings may then be implemented at the CLI level using tools supplied by the host OS environment. For example, in Linux, if /dev/sdb1 is the specified partition, then executing the shell script disk="/dev/sdb1"

part_entry='fdisk -l -u | grep "$disk" 2>/dev/null echo "$part_entry"

may result in the output

/dev/sdb1 * 2048 1026047 512000 83 Linux where 2048 is the "start LBA" and 1026047 the "end LBA", indicating the LBA range 132b.

In embodiments, in the specific case of a swap device hinting may relate to the I/O range:

[(<StartLBA of Swap Partition>+<StartLBA Specified>), <NumLBAs>]

This range may be directly stored in firmware with the suitable hint 132 supplied by the user (in the case of this specific example of swap, hint type 132c may be volatile-cache). In embodiments, all hints for the I/O range corresponding to the given device 132a may be handled directly by firmware.

Referring to FIG. 3B, in embodiments the existing driver-level facility to organize file hints 134 and track them under their respective hint devices may be extended to support new capabilities or hint types. In embodiments, a user may pass an out-of-band file hint 134 to the block driver 140 by indicating the corresponding hint device 134a and a file ID 134b. In some embodiments, the file hint 134 may additionally include a flag 134c identifying the hint as either a file hint or a device hint. In embodiments, the file ID 134b may be a filename with wildcard, or a unique index node (ex.—inode) associated with the file to be hinted. In embodiments, the command-line interface may find (from the filename provided) and pass a unique ID of the partition device including the file 120 system in which the file to be hinted is found.

Referring to FIG. 3C, in embodiments file hints may be organized via hierarchical hint table by hint driver 142. Under each hint device 144(a)...144(M), one or more file systems 120(a)...120(N) may be organized. File IDs 134(b) (ex.—inodes, filenames) may then be organized underneath the file system 120 to which they belong. In some embodiments, a set of hints corresponding to filename and hint type may not be persistently stored either in the hint driver 142 or in the hint firmware 152, but loaded at every system bootup.

For example, in embodiments incorporating a Linux environment, every file within a file system 120 may be uniquely identifiable by an inode. Therefore every bio structure in an I/O request handed off to a block device driver 140 may have an associated inode. The bio structure in the I/O request (scp) may then be obtained via the command
bio=scp→request→bio
and the inode associated with the bio structure via
inode=bio→iovec→pages→address_space_object→owner_inode.
In embodiments the device identifier 134a, or <dev> field, specified in the bio structure may be used to locate the corresponding hint device 144. Once an I/O request is identified as belonging to a file via the corresponding associated inode, the system can search the hint table associated with the corresponding hint device 144 for a hint entry matching the associated inode. If a hint entry exists, the "hint priority" value specified for the file/inode is returned; otherwise, a return of zero indicates that no hint entry exists for the file. Embodiments of the invention can extend hint table functionality to accommodate new hint types and associated caching instruction sets.

Figure 4:
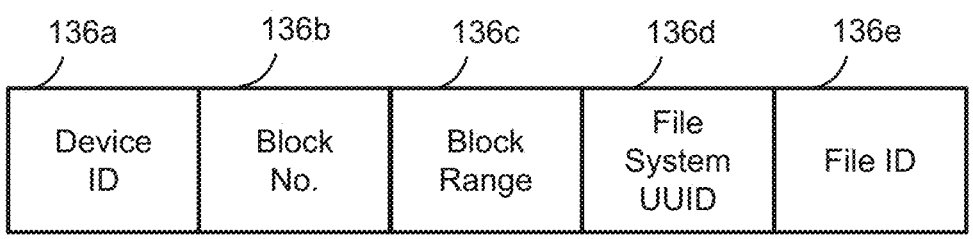
FIG. 4 is a block diagram of a hint structures according to embodiments of the invention.

FIG. 4 illustrates an embodiment of a hint structure compatible with multiple filesystems 120 on a single virtual device 100. In embodiments where a given virtual device 100 has more than one file system 120 of the same type or different types, the system may not be able to guarantee unique inodes across file systems. Therefore, the specific file system 120 to which a file belongs may also be detected. Regardless of how this is done, each file system 120 can be uniquely identified by a universally unique identifier (UUID) 136d. For example, every Linux file system has an identifying UUID fs_uuid, as does every Windows new technology file system (NTFS) and resilient file system (ReFS). Therefore for any I/O request, the corresponding device and block ranges can be uniquely identified by a 5-tuple 136 including device ID 136(a), block number 136(b), block count 136(c), file system ID 136(d), and file ID 136(e). In embodiments, file ID 136(e) may be a file inode identifier. <dev, blkno, blk_count, fs_uuid, file_inode>. Every file system 120 has a start block 136(b) and an end block on the given VD 100 on which it is created, which can be easily detected and stored in separate file system tracking structures linked to each VD 100.

In embodiments, a user may pass out-of-band hints between I/O processing layers via command-line interface (CLI), where hints contain the filename (or device) to be hinted and the hint type (ex.—hint classification). In some embodiments, a user may pass hints between different I/O processing layers. For example, CLI may pass the details of a file (e.g., its inode and UUID) or a device (its major and minor numbers, start LBA, and number of LBAs) and a hint type via I/O control to a block driver 140, along with a file/device flag 134(c). In embodiments, the block driver 140 may then pass this identity to the hint driver 142 by invoking a corresponding plug-in interface of the hint driver, about which the block driver 140 may be notified by the firmware. For example, once file hinting has been enabled on a VD 100 via a CLI command such as
MegaCli -fshint -enbl 1-Lx -a0
(where -Lx corresponds to VD x and -a0 corresponds to storage controller/adapter 0) then new command options for passing out-of-band hints may be introduced, such as
MegaCli -fshint -name <filename>-type <hint_type>-Lx -a0
where the filename may be specified as either a relative or absolute path name. In embodiments, one or more filenames may be specified via wildcard characters as well, to be expanded by the shell provided by the native OS environment. The CLI may then implement the code to find the associated inode for any given file and use the associated inode as the identity of the file 136(e) within a file system 120. In embodiments, CLI may additionally find and pass the UUID of the partition device containing the file system 120 on which the file is located.

In embodiments, a user may specify a change in hint type for an already hinted file or device (e.g., a change from sticky-cache to never-cache to free up pinned cache lines). When the hint driver 142 is notified of this change, the hint driver may inform the firmware of a change in hint type for the corresponding I/O range if the hint is a file hint 134. If a device hint 132 is changed (e.g., for a swap device), the firmware rather than the hint driver can take direct action. In embodiments, such a transitional hint may include instructions (in addition to those associated with the new hint type) for handling changes to the hinted object. For example, if a hinted object is changed from sticky-cache to never-cache, the transitional hint may include instructions for freeing up any associated sticky-cache windows.

We claim:

1. A method for processing at least one Input/Output (I/O) request issued by an application to at least one of a filename, a device, and a continuous range of logical block addresses (LBA) of a virtual device via out-of-band hinting, comprising:

directly interfacing with at least one of a storage controller and a block driver while bypassing an I/O stream;

defining at least one hint, the at least one hint including the at least one of a filename, a device, and a continuous range of logical block addresses,
a hint type, and
associated instructions for processing the at least one I/O request; and passing the at least one hint to the at least one of a storage controller and a block driver while bypassing the I/O stream.

2. The method of claim 1, wherein the hint type includes at least one of a priority-cache hint type, a never-cache hint type, a sticky-cache hint type, and a volatile-cache hint type.

3. The method of claim 2, wherein the hint type is a priority-cache hint type and the associated instructions include
instructions for maintaining at least one virtual cache window associated with the at least one I/O request in a first queue associated with a priority value.

4. The method of claim 3, wherein the first queue is a least-recently-used queue and the priority value is selected from a continuous range of integers from 1 to 15.

5. The method of claim 2, wherein the hint type is a never-cache hint type and the associated instructions include
instructions for passing the at least one I/O request directly to a storage device;

instructions for preventing the creation of a physical cache window associated with at least one continuous range of logical block addresses associated with the at least one I/O request; and instructions for forcing eviction of the at least one continuous range of logical block addresses.

6. The method of claim 2, wherein the hint type is a sticky-cache hint type and the associated instructions include instructions for converting at least one continuous range of logical block addresses associated with the at least one I/O request to a physical cache window; and instructions for maintaining at least one continuous range of logical block addresses associated with the at least one I/O request in a second queue, if the at least one continuous range of logical block addresses has been modified and its contents written to a storage device.

7. The method of claim 2, wherein the hint type is a volatile-cache hint type and the associated instructions include instructions for converting at least one continuous range of logical block addresses associated with the at least one I/O request to a physical cache window; and instructions for maintaining the at least one continuous range of logical block addresses in a third queue if the size of an associated virtual device is not greater than the size of the associated cache device.

8. The method of claim 2, wherein the hint type is at least one of a sticky-cache classification and a volatile-cache hint type and the associated instructions include instructions for flagging the at least one continuous range of logical block addresses associated with the at least one I/O request as either sticky-cache or volatile-cache; and instructions for maintaining the at least one continuous range of logical block addresses in a second queue.

9. The method of claim 1, wherein the passing the at least one hint to the at least one of a storage controller and a block driver includes passing the at least one hint to the at least one of a storage controller and a block device driver via at least one of a command-line interface and a graphical user interface.

10. The method of claim 1, wherein the specifying at least one hint includes determining the file system to which the at least one file belongs;

determining an index node uniquely associated with the at least one file;

searching at least one hint table for a hint associated with the index node; and returning at least one of an associated hint type and a null value.

11. The method of claim 1, wherein the passing the at least one hint to a block driver includes:

notifying the at least one block driver of a change in hint type.

12. The method of claim 1, wherein the defining at least one hint, the at least one hint including the at least one of a filename, a device, and a continuous range of logical block addresses, a hint type, and associated instructions for processing the at least one I/O request, includes:

defining instructions associated with transitioning the at least one of a filename, a device, and a continuous range of logical block addresses from a first hint type to a second hint type.

13. A system for managing a processing of an Input/Output (I/O) request from at least one application via out-of-band hinting, comprising:

a hint engine configured to enable the at least one application to specify at least one hint and to pass the at least one hint to at least one of a block driver and a storage controller;

a storage controller including hint firmware configured to directly process the at least one hint;

a block driver including a hint driver configured to directly process the at least one hint and to notify the hint firmware of a change in hint type;

a configuration tool communicatively coupled to the hint driver and to the hint firmware, configured to manage the at least one hint;

at least one virtual device including a first continuous range of logical block addresses (LBA);

at least one file system operably coupled to the block driver; and at least one storage device operably coupled to the storage controller.

14. The system of claim 13, wherein the at least one storage device includes at least one cache device including a plurality of cache windows, each cache window including a continuous range of logical block addresses, a metadata structure, and a plurality of cache lines.

15. The system of claim 13, wherein the at least one hint includes at least one of a filename, a device, and a second continuous range of LBAs of the virtual device; and a hint type.

16. The system of claim 15, wherein the at least one hint further includes:

a flag indicating whether the at least one hint is a file hint or a device hint.

17. The system of claim 13, wherein the configuration tool is configured to load the at least one hint;

query the at least one hint;

modify the at least one hint;

remove the at least one hint; and pass the at least one hint via at least one of a graphical user interface and a command-line interface.

18. The system of claim 13, wherein at least one of the hint driver and the hint firmware is further configured to process additional instructions associated with the change in hint type.

19. The system of claim 13, wherein the hint driver includes at least one hint table, the at least one hint table including at least one hint device, each hint device associated with at least one file system, at least one unique identifier corresponding to the at least one file system, each file system associated with at least one index node, each index node uniquely associated with a filename.

20. A data storage apparatus configured to manage a processing of an Input/Output (I/O) request from at least one application via out-of-band hinting, comprising:

a hint engine configured to enable the at least one application to specify at least one hint and to pass the at least one hint to at least one of a block driver and a storage controller;

a storage controller including hint firmware configured to directly process the at least one hint;

a block driver including a hint driver configured to directly process the at least one hint and to notify the hint firmware of a change in hint type;

a configuration tool communicatively coupled to the hint driver and to the hint firmware, configured to manage the at least one hint;

at least one virtual device including a first continuous range of logical block addresses (LBA);

at least one file system operably coupled to the block driver; and at least one storage device operably coupled to the storage controller.

* * * * *